Rose & Brown,
Tire Upsetting.
No. 95,144.
Patented Sep. 21. 1869.

Witnesses
John A. Ellis
J V White

Inventors
Rose & Brown

United States Patent Office.

JOHN B. ROSE AND JEROM B. BROWN, OF NEW LONDON, WISCONSIN.

Letters Patent No. 95,144, dated September 21, 1869.

---

IMPROVED UPSET, PUNCH, AND SHEARS.

---

The Schedule referred to in these Letters Patent and making part of the same.

---

*To all whom it may concern:*

Be it known that we, JOHN B. ROSE and JEROM B. BROWN, of New London, in the county of Waupacca, and State of Wisconsin, have invented certain new and useful Improvements in Upset for Punch and Shears; and we do hereby declare that the following is a full, clear, and exact description thereof, reference being had to the accompanying drawings, and to the letters of reference marked thereon, which form a part of this specification.

Our present invention relates to a machine for upsetting, punching, and cutting tires, and consists in the construction and general arrangement of such a machine, but, more particularly, in having the upset travel with the upsetting-power.

In order to enable others skilled in the art to which our invention appertains, to make and use the same, we will now proceed to describe its construction and operation, referring to the annexed drawings, in which—

Figure 1:
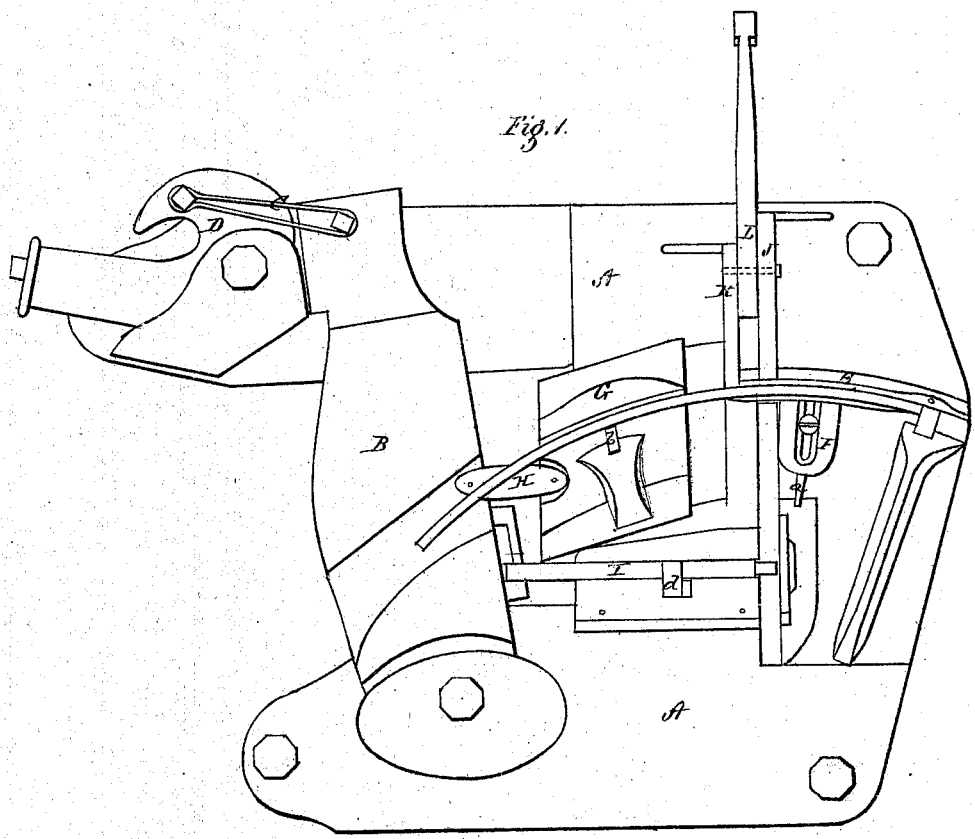
Figure 2:
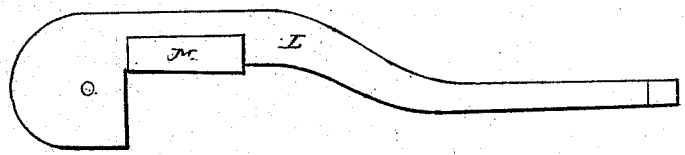

Figure 1 is a plan view of our machine; and
Figure 2, a side view of the upper shear.

A represents the platform or bed of the machine, to which, at a suitable point, is pivoted the lever B.

The outer end of this lever is, by a chain or rod, C, connected with an eccentric, D, which is also pivoted to the platform A.

It will be seen, that by turning the eccentric D one way, it carries the lever B with it, by means of the connecting-rod C, while, if the eccentric is turned in the other direction, it presses the lever ahead of it.

At a suitable point on the platform A, is a curved stationary steel knee, E, and a movable knee, F, between which two the tire is placed, and held in position, by means of a wedge, *a*, which presses the movable knee up against the tire.

The tire passes against the curved shoulder of the upset G, where it is held by a wedge, *b*.

The upset G slides in grooves, or otherwise, on the platform A, and is, by means of the connecting-bar H, attached to the lever B, so that it will follow the movement of said lever on the circle of the tire.

The knee E and the shoulder on the upset G form part of a circle for upsetting the tire.

To the inner side of the lever B, the punch I is suitably connected, so as to be pressed inward or drawn outward by the lever.

The punch works in a groove on the platform A, and is prevented from coming out of said groove by a pin, *d*, inserted in the platform, and shaped so as to overlap the punch, allowing the punch, however, to slide freely back and forth.

J represents the lower portion of the shears, between which and an ear, K, is pivoted the lever L, which is provided with a blade, M, which forms the upper part of the shears. The peculiar construction of the lever L is seen in fig. 2.

The point where the lever is pivoted is situated below the edge of the shears.

Having thus fully described our invention,

What we claim as new, and desire to secure by Letters Patent, is—

The movable upset G, connected, by the plate H, to the lever B, and travelling with the same, substantially as herein set forth.

In testimony that we claim the foregoing as our own, we affix our signatures in presence of two witnesses.

JOHN B. ROSE.
JEROM B. BROWN.

Witnesses:
E. P. PERRY,
FREDERICH P. HALE.